United States Patent [19]
Holladay

[11] 3,891,019
[45] June 24, 1975

[54] TIRE CHANGING APPARATUS
[75] Inventor: Jimmie L. Holladay, Antioch, Tenn.
[73] Assignee: The Coats Company, Inc., LaVergne, Tenn.
[22] Filed: June 25, 1973
[21] Appl. No.: 373,491

[52] U.S. Cl. ............................ 157/1.24; 144/288 A
[51] Int. Cl. .......................................... B60c 25/06
[58] Field of Search ................. 157/1.24, 1.26, 1.28; 92/8, 9, 12

[56] References Cited
UNITED STATES PATENTS

| | | | |
|---|---|---|---|
| 2,547,976 | 4/1951 | Rockwell | 157/1.24 |
| 2,777,507 | 1/1957 | Branick | 157/1.24 |
| 2,866,442 | 12/1958 | Panariti | 92/12 |
| 3,489,198 | 1/1970 | Malinski | 157/1.24 |
| 3,742,999 | 7/1973 | Myers, Jr. | 157/1.28 |
| 3,791,434 | 2/1974 | Duquesne | 157/1.24 |

FOREIGN PATENTS OR APPLICATIONS

| | | | |
|---|---|---|---|
| 996,319 | 12/1951 | France | 157/1.24 |

*Primary Examiner*—Donald G. Kelly
*Assistant Examiner*—Harold P. Smith, Jr.
*Attorney, Agent, or Firm*—Wegner, Stellman, McCord, Wiles & Wood

[57] ABSTRACT

A tire changer of a type wherein a rotatable receiving table is provided with rim-gripping apparatus for holding a rim securely to the table when the table is rotated relative to a tire mounting and/or demounting tool. At least three rim-gripping members are movable relative to a pre-determined point on the table and have flared surfaces facing the pre-determined point. A motor is provided for moving the rim engaging members toward and away from a rim received on the table and the rim engaging members are mounted for limited movement in a direction transverse to the table so that when they engage a rim, a downward force is exerted against the rim and causes the same to tightly frictionally lock against the rim supporting surface of the table to preclude relative rotation between the rim and the table during a mounting or demounting operation. Also discussed is a unique system in rotating for the table during mounting and demounting operation including a fluid cylinder having an internal-pot for regulating the rotation.

4 Claims, 4 Drawing Figures

PATENTED JUN 24 1975

3,891,019

SHEET 1

TIRE CHANGING APPARATUS

BACKGROUND OF THE INVENTION

This invention relates to tire changers and more specifically tire changers of the type having a rotatable rim-gripping table for rotating a rim and tire thereon relative to a tire mounting tool. Typical of the prior art is U.S. Pat. No. 3,493,030 to Strang et al.

Over the years there have been a variety of proposals of tire changing apparatus of the type having a rotatable rim-gripping table which receives and grips the rim to rotate the same relative to a tire demounting and/or mounting tool. Typically, upstanding lugs of one sort or another are employed to grip the flange of the rim so that the same cannot rotate relative to the table during demounting or mounting operations.

Because considerable forces are developed during either operation, frequently the lugs have been knurled so as to tightly grip the rim flanges. This approach, however, is unsatisfactory from the viewpoint that many rims in use today are so called "decorative" rims and the knurling mars the rim surface during clamping of the rim to the table. Where relatively smooth surfaces are employed on the lugs, it has been necessary to apply a substantially greater clamping force to preclude relative rotation between rim and table. Frequently, the table increased clamping force is such as to also mar the rims.

Thus, there is a real need for the tire changing apparatus of the type embodying rotatable rim-gripping table having rim-gripping lugs which will not mar the rims.

Another difficulty is encountered in tire changing apparatus today, whether of the type wherein a table is then rotated relative to a stationary tool or the type wherein a tool is rotated relative to a stationary table, is in the motive power for effecting relative rotation. Frequently, a single acting fluid cylinder has been employed for the purpose along with a spring return. Difficulties have been encountered in regulating the rate of movement and since a spring return is used, no mounting or demounting operation can be performed during the return with the result that time may be wasted thereby decreasing the efficiency of the tire changing operation.

SUMMARY OF THE INVENTION

One principal object of the invention is to provide a new and improved tire changing apparatus of the type embodying a rotatable rim-gripping table wherein the rim-gripping means will not mar a rim.

Another principal object of the invention is the provision of the tire changing apparatus wherein relative rotary movement may be effected between tire changing tool and a rim mounted on a table under power bidirectionally and with excellent rate control.

The exemplary embodiment of the invention achieves the foregoing objectives in a structure including a table mounted for rotation on a tire changing stand along with means for rotating the table so that a rim gripped thereon may be rotated relative to a tire changing tool for tire mounting and demounting.

The table mounts upstanding lugs extending upwardly from a planar rim receiving surface for gripping the flange of a rim. Each of the lugs includes a flared surface facing inwardly toward the rim and is mounted for movement toward and away from the rim.

The mounting means for the lugs is such that the same are capable of limited movement in a direction transverse to the planar rim receiving surface of the table. As a result, when the rim engaging lugs engage the rim, they exert downward force on the rim so that the same frictionally locks against the planar surface of the table to preclude relative rotation between the rim and the table during a tire changing operation. The unique construction provides satisfactory holding force without exerting radial forces against the rim sufficient to mar the same and without the use of knurling on the rim engaging lugs.

To effect bidirectional powered relative rotation between the table and the tool, a fluid operated, double acting cylinder is provided for rate control, and the cylinder includes an internal-pot.

According to the preferred embodiment, a sleeve is provided with end plates and a substantially centrally located center plate. Two chambers are thus defined within the sleeve and a piston is located in each of the chambers.

An elogated piston rod extends through at least one of the end plates as well as through an opening in the central plate to mount both of the pistons. The opening in the central plate is slightly larger than the piston rod and a body of fluid is located between the pistons. A dash-pot action is achieved when the rod is moved in either direction by the restriction posed by the opening in the central plate due to the flow of the body of fluid from one side thereof to the other.

Other objects and advantages of the invention will become apparent from the following specification taken in conjunction with the accompanying drawings.

DESCRIPTION OF THE PREFERRED EMBODIMENT

Figure 1:
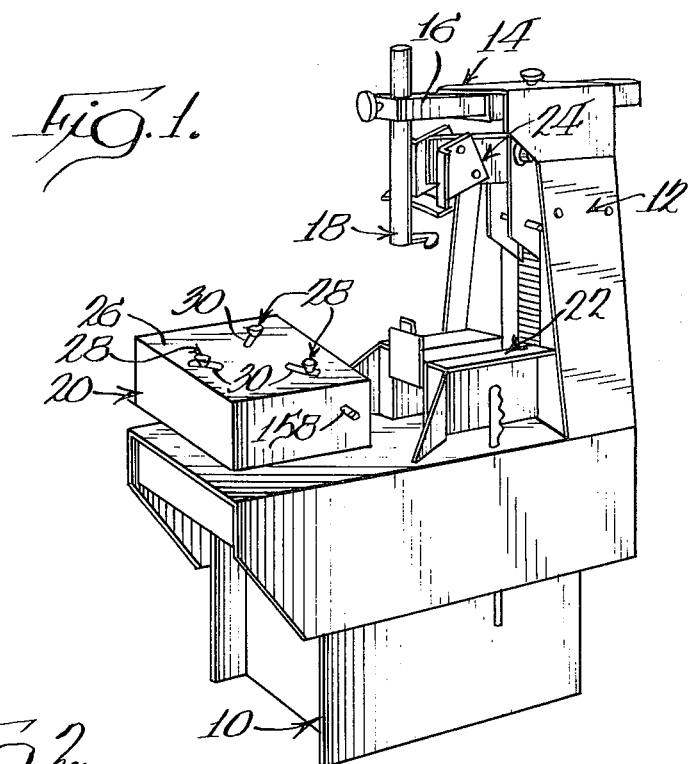
FIG. 1 is a perspective view of a tire changing apparatus made according to the invention.

With reference to FIG. 1, a tire changing apparatus embodying the invention is seen to include a base, generally designated 10 having an upstanding column, generally designated 12, at one side thereof. The upper end of the column 12 includes adjustable means, generally designated 14, including an arm 16 by which a tire changing tool, generally designated 18, may be moved toward and away from a rotatable rim-gripping table, generally designated 20. As is well known, means are also provided whereby the vertical position of the tool 18 can be adjusted.

Intermediate the column 12 and the rotatable table 20 is a rim receiving surface, generally designated 22, which is aligned with an upper bead breaker assembly, generally designated 24, which may be employed to break the bead of a tire resting on the surface 22. A lower bead breaking assembly (not shown) may be provided if desired. In general, the arrangement is along the lines of the previously identified Strang et al. patent.

The table 20 includes a planar upper surface 26 and upstanding therefrom and moveable relative thereto are equally radially spaced rim engaging elements, generally designated 28. In the preferred embodiment, at least three of the elements 28 are provided and each is movable toward and away from the center of the table 20, in arcuate slots 30. Thus, a rim substantially centrally located on table 20 may have its lower flange engaged by the elements 28 when they are moved inwardly toward the center of the table 20.

Figure 2:
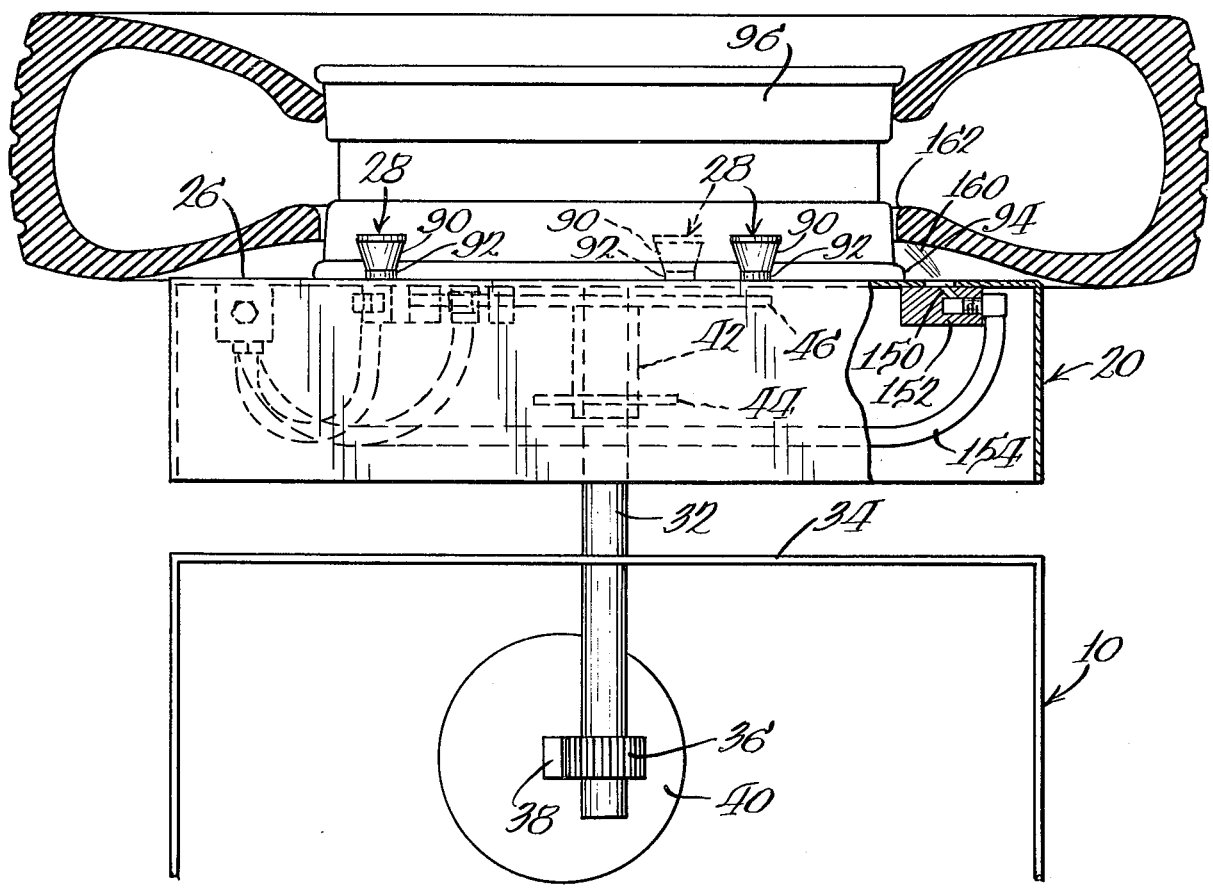
FIG. 2 is a vertical section of a rotatable, rim-gripping table.
Figure 3:
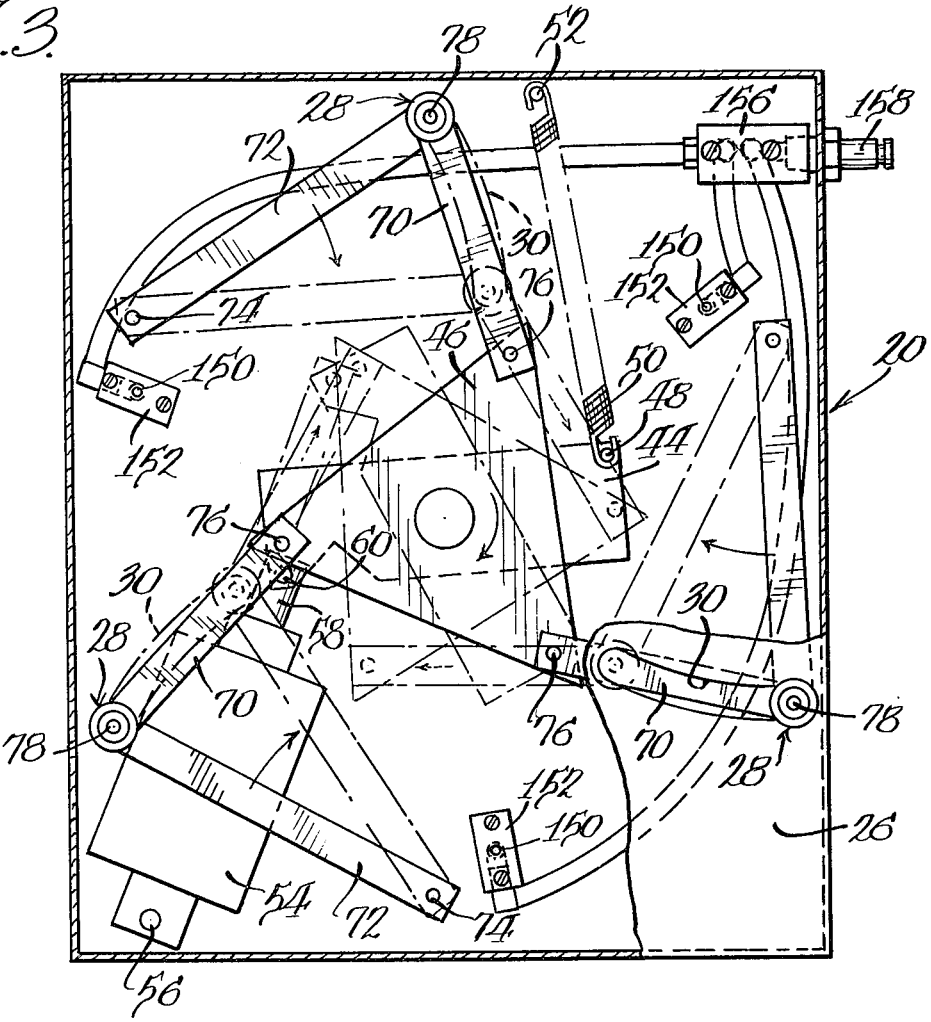
FIG. 3 is a somewhat schematic horizontal section of the table.

Referring now to FIG. 2 and 3, the table 20, in addition to having the planar upper surface 26, also includes a depending peripheral skirt 30 which serves to house various components. The table 20 is mounted on the upper end of a rotatable shaft 32 which extends through an opening (not shown) in the upper surface 34 of the base 10. Suitable bearings, not shown, mount the lower end of shaft 32 for rotation so that the table 20 may be rotated therewith.

Near the lower end of the shaft 32 and within the base 10, the shaft 32 mounts a spur gear 36 which is engaged by a rack 38 which in turn is reciprocated by a cylinder 40 to be described in greater detail hereinafter. Suitable mounting means for the cylinder 40 and suitable guide means for the rack 38, neither of which are shown, are provided.

Below the planar surface 26 and within the housing defined by the skirt 30, the upper end of the shaft 32 rotatably receives a sleeve 42 having a rectangular plate 44 secured thereto near its lower end and a triangular plate 46 secured thereto near its upper end. As best seen in FIG. 3, one corner of the rectangular plate 44 includes a pin 48 for securing one end of a spring 50 thereto. The opposite end of the spring 50 is secured as by a pin 52 to a portion of the table.

Within the housing defined by the skirt 30 is an air cylinder 54 having its casing pivotally secured as by a pin 56 to the table and having an extendable rod 58 secured by a pivot pin 60 to the corner of the rectangular plate 44 opposite the pin 48. As a result extention or retraction of the rod 56 rotates the plate 44 and thus both the sleeve 42 and the plate 46 about a vertical axis defined by the center of the shaft 32.

As generally alluded to previously each of the three rim engaging members 28 are mounted for movement within arcuate slots 30 in the planar surface 28 of the table. The arrangement is such that the path of movement is directed towards the rotational axis of the table. Mounting means for this purpose include for each of the rim engaging members 28, first and second links 70 and 72. One end of the link 72 is pivotally connected by a pin 74 to the table while the opposite end of the link 70 is pivotally connected as by a pin 76 to a corresponding corner of the triangular plate 46. The other ends of the links 70 and 72 are pivotally connected as by pins 78 to each other. The pins 78 are furthered such as to extend upwardly through the slot 30 to journal the rim engaging members 28.

Returning now to FIG. 2, each of the rim engaging members 28 is seen to include a flared surface facing the center of the table 20, which flared surface is defined by an inverted frusto-cone 90. The lower end of each frusto-cone terminates in a cylindrical portion 92 which extends through the corresponding slot 30.

As a result of the foregoing description, it will be recognized that the flared surface defined by each frusto-cone 90 will bear against the flange 94 of a rim 96 when the latter is mounted on the table and initially make point contact therewith. It will also be recognized that the links 70 and 72 will deflect somewhat under loading and that factor, coupled with the cylindrical lower ends 92 of the rim engaging members 28, causes the latter to be mounted for limited movement in a direction transverse to the planar surface 28 of the table 20. Thus, when the cylinder 54 is actuated to move the rim engaging members 28 toward the center of the table to engage a rim, initially the latter will ride up on the rim flange 94 and will then move downwardly an almost imperceptible distance and tip such that their upper ends are located somewhat outwardly relative to the bottom ends thereof. This results in a vertical force being applied to the upper surface of the rim flange 90 to draw the same downwardly and tightly against the planar surface 26 of the table to frictionally lock the rim against the table. In other words, the locking force precluding relative rotation between the table 20 and the rim 96 is established by friction between the rim and the table as opposed to the rim engaging members 28 acting radially on the rim.

It has been determined that such force is sufficient such that no roughing of the surface of the rim engaging members 28 need be provided and, as is apparent, since the same are in effect rollers pivotally received from the pin 78, the holding action is due to the friction engagement of the rim with the table top. Thus, the rim engaging elements 28 will not mar the periphery of a rim received on the table.

Figure 4:
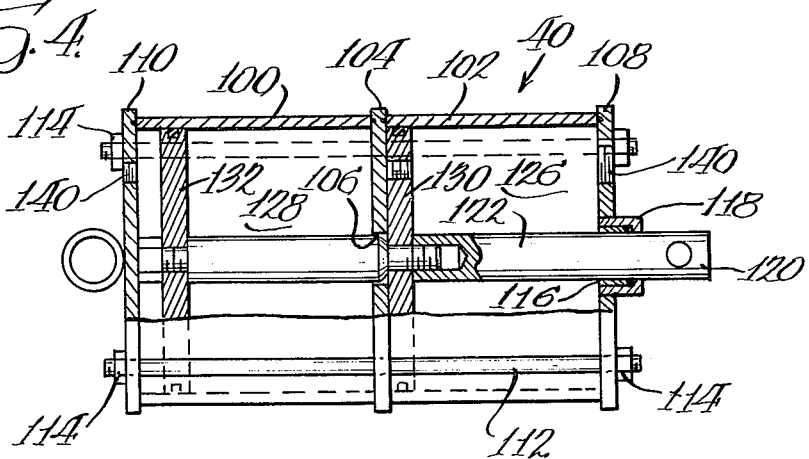
FIG. 4 is a side elevation of a cylinder having an internal dash-pot used to drive the table with parts shown in section for clarity.

Turning now to FIG. 4, the cylinder 40 will be described in greater detail. Basically, the same is comprised of a hollow cylindrical sleeve defined by a sleeve 100 and a sleeve 102. Interposed between the two sleeves 100 and 102 is a central plate 104 having a central aperture 106. End plates 108 and 110 are provided at the ends of the sleeves 100 and 102 and are held in place by retaining rods 112 and nuts 114 located exterior of the sleeves 100 and 102 as is well-known in the art.

The end plate 108 includes an opening 116 surrounded by a seal 118 through which an end 120 of a piston rod 122 emerges for connection to the rack 38 as seen in FIG. 2. The rod 122 also extends through the opening 106 in the central plate 104 and the end plate 108 and into a chamber 128 defined by the central plate 104 and the end plate 100.

Within each of the chambers 126 and 128 is an associated piston 130 and 132, respectively. Both of the pistons 130 and 132 are connected to the rod 122 for movement therewith. In addition, each of the end plates 108 and 110 is provided with a port 140 so that fluid under pressure, normally air, could be directed against either the piston 130 or the piston 132 at the right and left hand sides of the two respectively.

In the preferred embodiment, the opening 106 and the central plate 104 is slightly larger than the rod 122. For example, the opening 106 may be circular and have a radius approximately 0.010 inches greater than the radius of the rod 22 if the latter is cylindrical. As a result a small space is formed.

A body of fluid, such as hydraulic oil, is located between the pistons 130 and 132. Thus, when fluid under pressure is applied to the left side of the piston 132 to cause the same to move to the right as viewed in FIG. 4, the body of the fluid, which will initially be entirely within the chamber 128, will be forced through the small space between the opening 106 and the rod 122 to the right-hand side of the central plate 104. The smallness of the opening provides a restriction to such fluid flow such that an internal dash-pot is defined to control the rate of movement of the rod 122. When both of the pistons 130 and 132 have been fully moved to the right, the application fluid under pressure through the port 140, will cause the reverse action, again restricting movement.

It will be recognized that the use of a cylinder such as illustrated in FIG. 4, provides ideal movement rate control in a single structure. Moreover, the use of a double acting cylinder for rotating the table 20 allows the same to be rotated in one direction to an extreme position where upon one bead of a tire may be completely mounted or demounted. The table may then remain in that position of movement until the operator is prepared to mount or demount the other bead of the tire and then returned to the initial position or opposite extreme of movement.

As a result, no time is wasted as would be the case with a conventional spring return for the table.

To maximize the efficiency of the tire changing operation, an inflation device is embodied in the table 20. In particular, at equally radially spaced positions, the planar surface 26 is provided with openings 150 below which are mounted air directing nozzles 152. Each of the nozzles 152 includes a hose connection 154 to a fitting 156 within the table (see FIG. 3) which has a connection to an exterior quick-disconnect coupling 158. When air under pressure is directed to the coupling 158, the same will emerge from the nozzles 152 through the openings 150 at three locations in stream illustrated at 160 in FIG. 2 to be directed at the interface of the lower bead 162 of a tire and the rim 96 on the table. Through the use of an air chuck (not shown) connected to the inflation valve on the tire, and the application of a large volume of air directed through the nozzles 152, the beads on a tire may be quickly seated in place on the rim. It is also to be observed that during such inflation operation, the rim engaging members 28 need not be, and preferably are not, engaged with the flanges 94 on the rim.

From the foregoing, it will be seen that a tire changing apparatus made according to the invention achieves the objects of insuring against relative rotation of a rim and a table during a tire mounting and demounting operation with a minimum of force and without the use of knurled rim engaging surfaces which would mar rims. It will also be appreciated that whether the tire changing apparatus be of the type having a rotatable table movable relative to a stationary tool or be of the type wherein a tool may be rotated relative to a stationary table, use of the double acting cylinder having internal-pot maximizes the efficiency of the tire changing operation while providing ideal rate control and minimizing space requirements for the motor.

I claim:

1. In a tire changing apparatus including a rim receiving table, means associated with said table for holding a tire rim stationarily thereon, a tire mounting and/or demounting tool and means for effecting relative rotary movement between a rim on said table and said tool, the improvement in said holding means comprising at least three rim engaging elements movably affixed to said table and extending upwardly from a rim receiving surface thereon and movable toward and away from a predetermined position on said table, each of said rim engaging members having downwardly canted surfaces facing said predetermined position; means mounting said rim engaging members for movement on said table toward and away from said predetermined position on said table and providing for a limited amount of movement toward and away from said rim receiving surface in a direction generally non-parallel thereto; and means for moving said rim engaging members toward said predetermined position whereby when said rim engaging members engage the flange of a rim received on said surface, the same will exert a downward force on said rim to cause the same to frictionally lock against said surface to preclude rotation of said rim relative to said table when relative movement is being effected between said tool and said table; said mounting means including slots in said surface, said rim engaging members extending through said slots, and a plurality of links, one for each of said rim engaging members, beneath said slots having one end mounting an associated one of said rim engaging members and the other end pivotally secured to said table; said one end of each of said links being free for limited movement toward and away from said slots in a direction transverse to said surface.

2. Tire changing apparatus according to claim 1 wherein each of said rim engaging members comprises an inverted frusto-conical roller.

3. In a tire changing apparatus including a rim receiving table, means associated with said table for holding a tire rim stationarily thereon, a tire mounting and/or demounting tool and means for effecting relative rotary movement between a rim on said table and said tool, the improvement in said holding means comprising at least three rim engaging elements movably affixed to said table and extending upwardly from a rim receiving surface thereon and movable toward and away from a predetermined position on said table, each of said rim engaging members having downwardly canted surfaces facing said predetermined position; means mounting said rim engaging members for movement on said table toward and away from said predetermined position on said table and providing for a limited amount of movement toward and away from said rim receiving surface in a direction generally non-parallel thereto; and means for moving said rim engaging members toward said predetermined position whereby when said rim engaging members engage the flange of a rim received on said surface, the same will exert a downward force on said rim to cause the same to frictionally lock against said surface to preclude rotation of said rim relative to said table when relative movement is being effected between said tool and said table; said mounting means comprising a plurality of pairs of links, one for each of said rim engaging members, adjacent ends of the links of each pair being pivotally connected together and an opposite end of one of said links being pivotally secured to said table; said moving means being pivotally connected to the opposite end of the other of said links; and said rim engaging members being located approximately at the pivotal interconnection of the two links of each pair whereby said links may deflect in a direction transverse to said surface to provide said limited movement.

4. A tire changing apparatus including a rim receiving table; said apparatus being adapted to be associated with a tool for use in mounting and demounting tires from rims received on said table; said apparatus further including means for effecting relative rotational movement between the tool associated therewith and said table, said movement effecting means including a fluid actuated, double acting cylinder having an internal dashpot whereby said relative movement may be effected bidirectionally and the rate of movement controlled by said internal dashpot, said internal dashpot having a closed, restricted flow fluid circuit wholly within said cylinder; said double acting cylinder and internal dashpot including a cylindrical sleeve having a pair of end walls and an approximately central wall to provide two compartments; a pair of pistons, one in each of said compartments; a piston rod having an end extending exteriorly of at least one of said end plates and passing through an opening in said central plate and mounting both of said pistons; said opening being slightly larger than said piston rod; and a body of fluid trapped between said pistons to define a dashpot, said opening defining the restriction to the flow of said body fluid in said closed, restricted flow fluid circuit from one side of said central plate to the other side thereof to control the rate of movement of said piston rod.

* * * * *